Patented Feb. 3, 1931

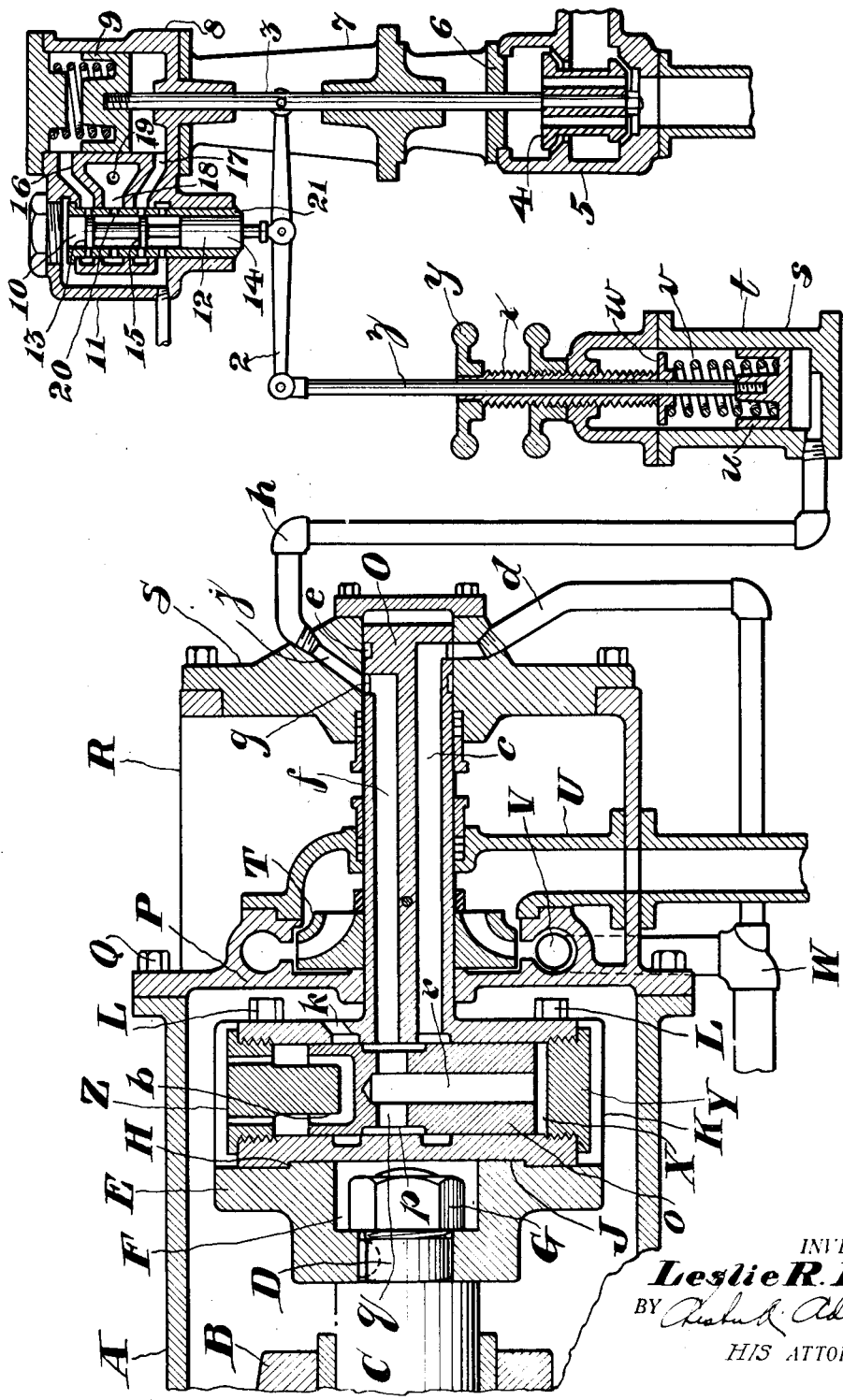

1,791,028

UNITED STATES PATENT OFFICE

LESLIE R. HUFF, OF PHILLIPSBURG, NEW JERSEY, ASSIGNOR TO INGERSOLL-RAND COMPANY, OF JERSEY CITY, NEW JERSEY, A CORPORATION OF NEW JERSEY

HYDRAULIC SPEED GOVERNOR

Application filed September 18, 1928. Serial No. 306,715.

This invention relates to speed governors, but more particularly to a hydraulic speed governor adapted to be interposed between a source of liquid pressure, as for instance, oil under pressure, and an element intended to be governed.

One object of the invention is to assure a minimum amount of variance in the speed of the element intended to be governed. Another object is to render the device delicately responsive to any variation in the operating speed of a prime mover.

Other objects will be in part obvious and in part pointed out hereinafter, and to all of these ends the invention consists of the combination of elements and arrangement of parts having the general mode of operation substantially as hereinafter described and claimed in the specification and illustrated in the accompanying drawing, the figure of which illustrates a sectional elevation of the hydraulic speed governor applied to the end of a rotary member, such as the main shaft of a turbo blower and the like.

Referring more particularly to the drawing, A represents the casing of the machine intended to be driven, such as a turbo blower, and B a bearing of the machine in which is journalled a main shaft C. The main shaft C in this instance has a reduced threaded end D on which is mounted a flange E having a recess F in which may be disposed a nut G whereby the flange E may be securely fastened to the end D of the shaft.

The flange E in the present instance has a cylindrical projection H at its forward face to extend into a recess J of a casing K for centralizing said casing with respect to the shaft C. The casing K may be secured to the flange E in any suitable manner, in the present instance bolts L are indicated for this purpose Preferably the casing K carries an integral projection or shaft O which is journalled in a cover plate P adjacent the casing K and is secured to the end of the frame A by means of bolts Q. The cover plate P may be provided with an integral extension R which supports at its outer end a plate S to act as a bearing for the outer or free end of the shaft O.

In the construction shown the shaft O serves as a mounting for an impeller T adapted to draw liquid, such as oil, from a reservoir (not shown) through a pipe U. Such oil is discharged from the impeller T into a discharge chamber V formed in this instance in the cover plate P. The function of the pump comprising the impeller T and the discharge chamber V is to supply oil to the various bearings of the machine to which the device may be attached. The pump is accordingly provided with a pipe W through which the oil may flow from the pump chamber V to the bearings intended to be supplied.

The pump mechanism illustrated is merely shown as one means of supplying lubricant under pressure to the machine. It is therefore to be understood that the invention is in no wise limited in its applicability to any particular type of machine intended to be lubricated or to any specific type of pumping mechanism.

The casing K is provided with a valve chamber X which extends transversely through the casing K and preferably through the axis of rotation of the shaft C. A plug Y forms a closure for one end of the valve chamber X and a stop plug Z is threaded into the opposite end of the valve chamber and has a projection $b$ extending into the valve chamber X.

Formed in the shaft O is an inlet passage $c$ which communicates at one end with the valve chamber X and at its other end with a pipe $d$ leading from the pipe W. At the end of the inlet passage $c$ adjacent the pipe $d$ is an annular groove $e$ to assure constant communication between the inlet passage $c$ and the source of oil supply. A connecting passage $f$ also formed in the shaft O leads from the valve chamber X to an annular groove $g$ in the shaft O which is in constant communication with a pipe $h$ communicating with the groove $g$ through a passage $j$. The casing K in this instance also has an exhaust port $k$ adjacent the connecting passage $f$.

Disposed within the valve chamber X is a valve *o* of the plug type having an external groove *p* of such proportions as to afford communication between either the inlet passage *c* and the connecting passage *f* or between the connecting passage *f* and the exhaust port *k*, depending upon the position of the valve. A transverse passage *q* in the valve *o* conveys oil from the annular groove *p* to a longitudinal passage *r* in the valve and through which such oil may pass to the internal face of the plug Y forming a column along the passage *r* to act against the end of the valve *o* and thus resist movement of the valve.

The valve *o* in this instance is off-set with respect to the axis of rotation of the shaft C so that its center of gravity will lie to one side of the longitudinal axis of the shaft. This position of the valve will at all times be assured since the projection *b* of the plug Z serves to limit movement of the valve in a direction in which the center of gravity of the valve might otherwise move into coincidence with the longitudinal axis of the shaft.

In the drawing a practical use of the device is shown. The pipe *h* into which the oil from the connecting passage *f* passes is shown connected at its opposite end to a relay valve *s*. The relay valve *s* comprises a cylinder *t* and a piston *u* disposed in the cylinder *t*, the pipe *h* being connected to the cylinder *t* in such a manner that oil will only be introduced into the cylinder beneath the piston *u*. The piston *u* is normally held in the retracted position by a spring *v* seated on the piston at one end and with its other end on a spring seat *w* which bears against the end of an adjusting screw *x*, said adjusting screw *x* having a hand wheel *y* whereby the tension of the spring *v* may be varied to suit immediate requirements.

Connected to the piston *u* is a rod *z* which extends slidably through the spring seat *w* and the adjusting screw *x* and is pivotally connected at its outer or free end to a floating lever 2. The opposite end of the floating lever may be pivotally connected to a rod 3 connected to a steam admission valve 4 in a valve casing 5 through which motive fluid, such as steam, may flow from a source of supply to a prime mover (not shown), but which may be a steam engine whereby the turbo blower is actuated. The base 6 of a bracket 7 forms a cover for the top of the valve casing 5 and supports at its top a cylinder 8 in which is disposed a spring pressed piston 9 threaded in this instance to the end of the rod 3.

Suitable means are provided for controlling the admission of power, such as oil under pressure, to the ends of the cylinder 8 for actuating the piston 9 and consequently the valve 4. To this end a chamber 10 is formed in a valve chest 11 preferably adjacent the cylinder 8 to receive slidably a pilot valve 12 having end heads 13 and 14 and an intermediate head or flange 15. The head 13 in this instance controls a passage 16 leading to the upper end of the cylinder 8 and the intermediate flange 15 controls a passage 17 leading to the lowermost end of the cylinder 8. The head 14 acts merely as a guide for the valve and also forms a closure for one end of the valve chamber 10. Oil for actuating the pilot valve 12 is admitted into a chamber 18 in the valve chest 11 through a passage 19 and from thence passes into the valve chamber 10 through ports 20 formed in this instance in a valve bushing 21 inserted in the valve chest 11.

Inasmuch that the elements intended to be actuated, such as the relay valve *s* and the pilot valve 12 and the steam valve 4, do not form a part of the present invention but are merely shown for the purpose of illustrating one mode of application of the invention, further description thereof is considered unnecessary, it being intended merely to illustrate elements of a type in which it is preferable or desirable to actuate said elements at oil pressures lower than the pressure of the oil supplied for lubricating purposes.

The operation of the device is as follows: Let it be assumed the shaft C and the casing K are being rotated, oil will then be drawn through the pipe U by the impeller T and discharged into the discharge chamber V from whence it flows into the pipe W and into the pipe *d*. Inasmuch that the inlet passage *c* is in constant communication with the pipe *d* oil will also flow through the inlet passage *c* and through the groove *p* and the passages *q* and *r* to the internal face of the plug Y forming a column along the passage *r* to act against the valve *o*. Owing to the fact that the center of gravity of the valve *o* lies to one side of the axis of rotation of the shaft C, said valve will be centrifugally forced in an outwardly direction towards the plug Y thus tending to increase the area of communication between the groove *p* and the inlet passage *c* to wider limits. The oil however, in passing from the inlet passage *c* into the groove *p* is always considerably restricted even when the valve moves towards the plug Y and the pressure of the oil in the passages *q* and *r* as well as that in the connecting passage *f* will therefore be of considerably lower value than the pressure of the oil in the inlet passage *c*. The oil existing in the passage *f* and the pipe *h* and under this lower value pressure will then act against the piston *u* tending to raise said piston against the pressure exerted thereon by the spring *v*.

During the time that the prime mover is operating at the normal rate of speed, the pressure in the connecting passage *f* and therefore beneath the piston *u* will not have the effect of raising the piston *u* and therefore disturbing the position of the admission valve 4. When, however, due to various causes, the speed of the main shaft C increases, the increased speed of the shaft will cause the valve o to be thrown in an outwardly direction towards the plug Y, thus opening the area of communication between the inlet passage c and the groove p to wider limits. The oil in the passage c is then able to flow more freely through the groove p and so an increase of pressure will take place in the area of lower pressure existing in the passage f. Oil under higher pressure will then flow into the connecting passage f and through the pipe h beneath the piston u to raise said piston in the cylinder t. This movement of the piston u will raise the pilot valve 12 so that oil may flow from the chamber 18 through the ports 20 into the valve chamber 10 and thence through the passage 16 into the cylinder 8 to act on the upper surface of the piston 9 for depressing the admission valve 4 and thus reducing the flow of steam to the prime mover. This of course will have the effect of decreasing the speed of the shaft C and as a consequence the centrifugal force acting on the valve o will lessen and the valve o will again move in the direction of the stop plug Z restricting the opening between the groove p and passage c and thus reducing the amount of oil entering the groove p from the inlet passage c.

When the speed of the shaft C has been reduced to such an extent that the centrifugal force moving the valve o towards the plug Y lessens and the valve o moves towards the plug Y, the port k becomes uncovered and in communication with the annular groove p. The passage c is now covered by the movement of the valve o and the pressure of the oil in this passage c cannot act upon the oil in the passage f. The pressure upon the oil in the passage f being thus eliminated and the port k being uncovered it will be apparent that the oil in this passage f will flow through the port k into the sump in the main frame A. This action is expedited by the spring v in the cylinder t which, now that pressure upon the oil is removed, will actuate the piston u downwardly to empty the cylinder t of oil. This retraction of the piston u to the bottom of the cylinder t will move the pilot valve 12 downwardly so that oil may flow from the chamber 18 into the valve chamber 10 between the heads 13 and 15 and thence through the passage 17 beneath the piston 9 to raise said piston and consequently also the admission valve 4 to again admit a greater amount of steam to the prime mover.

I claim:

1. A hydraulic speed governor, comprising a casing adapted to be attached to a rotary member, a valve chamber in the casing extending through the axis of rotation of the casing, said casing having an inlet passage opening into the valve chamber and in constant communication with a source of liquid pressure supply, a connecting passage in the casing for conveying liquid from the valve chamber to an element intended to be actuated, and a valve in the valve chamber adapted to be centrifugally actuated and having an external groove to afford communication between the inlet and connecting passages, said valve having a passage for conveying liquid from the groove into the end of the valve chamber to act against the valve.

2. A hydraulic speed governor, comprising a casing adapted to be attached to a rotary member, a valve chamber in the casing extending through the axis of rotation of the casing, said casing having an inlet passage leading from a source of liquid pressure supply to the valve chamber, a connecting passage in the casing for conveying liquid from the valve chamber to an element intended to be supplied, a valve in the valve chamber offset with respect to the axis of rotation of the casing to enable said valve to be centrifugally actuated toward the end of the valve chamber during the rotation of the casing, an external groove in the valve to afford communication between the inlet and connecting passages, and a passage in the valve conveying liquid into the end of the valve chamber to act against the end of the valve.

3. A hydraulic speed governor, comprising a casing adapted to be attached to a rotary member and having a valve chamber extending through the axis of rotation of the casing, said casing having an exhaust port leading from the valve chamber to the exterior of the casing, an inlet passage and a connecting passage in the casing opening into the valve chamber, and a valve in the valve chamber having an external groove and being offset with respect to the axis of rotation of the casing to enable said valve to be centrifugally actuated for controlling communication by said groove between the inlet and connecting passages and between the connecting passage and the exhaust port to maintain a pressure in the exhaust passage.

4. A hydraulic speed governor, comprising a casing adapted to be attached to a rotary member and having a valve chamber therein, a projection on the casing having an inlet and a connecting passage extending into the valve chamber, and a centrifugally operated valve in the valve chamber having a groove therearound extending across the inlet and connecting passages and adapted to be centrifugally moved by the rotation of the rotary member to change the relationship between the groove and the said passages.

5. A hydraulic speed governor, comprising a casing adapted to be attached to a rotary member and having a valve chamber therein, a projection on the casing having an inlet and a connecting passage extending into the valve chamber, a centrifugally operated valve in the valve chamber having a groove therearound extending across the inlet and connecting passages and adapted to be centrifugally moved by the rotation of the rotary member to change the relationship between the groove and the said passages, and means on the casing extending into the chamber to limit the movement of said valve.

6. A hydraulic speed governor, comprising a casing adapted to be attached to a rotary member and having an exhaust port and a valve chamber therein, a projection on the casing having an inlet and a connecting passage extending into the valve chamber adjacent the exhaust port, and a centrifugally operated valve in the valve chamber having a groove therearound extending across the inlet and connecting passages and adapted to be centrifugally moved by the rotation of the rotary member to change the relationship between the groove and the said passages, said movement in one direction causing the inlet to be covered by the valve and the exhaust port to be uncovered by the groove.

7. A hydraulic speed governor, comprising a casing adapted to be attached to a rotary member and having an exhaust port and a valve chamber therein, a projection on the casing having an inlet and a connecting passage extending into the valve chamber adjacent the exhaust port, a centrifugally operated valve in the valve chamber having a groove therearound extending across the inlet and connecting passages and adapted to be centrifugally moved by the rotation of the rotary member to change the relationship between the groove and the said passages, said movement in one direction causing the inlet to be covered by the valve and the exhaust port to be uncovered by the groove, and means extending into the chamber to limit the movement of the valve in said direction.

In testimony whereof I have signed this specification.

LESLIE R. HUFF.